United States Patent [19]

Neefe

[11] 4,416,837
[45] Nov. 22, 1983

[54] SPIN CASTING OF CONTACT LENSES

[76] Inventor: Charles W. Neefe, 2701 Rebecca St., Big Spring, Tex. 79720

[21] Appl. No.: 417,641

[22] Filed: Sep. 13, 1982

[51] Int. Cl.³ .............................................. B29D 11/00
[52] U.S. Cl. .................................... 264/2.1; 264/2.5; 264/311; 425/808
[58] Field of Search ......................... 264/2.1, 2.5, 311; 425/808

[56] References Cited

U.S. PATENT DOCUMENTS

| | | | |
|---|---|---|---|
| 3,010,153 | 11/1961 | Bittner | 425/808 |
| 3,408,429 | 10/1968 | Wichterle | 264/2.1 |
| 3,660,545 | 5/1972 | Wichterle | 264/1.4 |
| 3,691,263 | 9/1972 | Stoy et al. | 264/2.5 |

Primary Examiner—James B. Lowe

[57] ABSTRACT

A simplified method of making spin cast contact lenses having front and back aspheric surfaces and no effective refractive aspherosity when in place on a spherical cornea.

4 Claims, 3 Drawing Figures

SPIN CASTING OF CONTACT LENSES

PRIOR ART

The art of spin casting contact lenses has been in use for nineteen years. The principal value of spin casting is its low cost and high production. The disadvantages are the lenses are not spherical and the aspheric surface is of a shape that increases spherical aberration. The exact shape is most difficult to describe due to its being formed by several forces including centrifugal force, surface tension, viscosity of the liquid and radius of the concave mold. The Panofocal concept described in U.S. Pat. No. 3,641,717 is widely used to reduce the effects of spherical aberration. The most frequent use of Panofocal lenses is to provide increased acuity for patients having astigmatism. The Panofocal aspheric surface is on the convex or plus lens surface and of longer radius toward the lens edge and reduces spherical aberration, improving the visual acuity of the wearer up to two lines Snellen. The aspheric surface formed on the concave or minus surface of a spin cast lens is also longer toward the edge, however, when the soft lens is placed on the eye, it results in a shorter radius toward the edge on the convex plus surface and greatly increases the spherical aberration effect. This has three disadvantages: (1) The usable optical zone in the center of the lens is reduced requiring the lens to center well. (2) The reduction in visual acuity due to increased spherical aberration effect. (3) Visual acuity will fluxuate with lens movement.

SUBJECT OF THE INVENTION

A method has been developed whereby the advantages of spin casting may be employed to produce lenses with reduced spherical aberration effect. The current lens molds are fabricated from steel or glass, each mold is individually ground and polished to the required specifications. To achieve accurate reproduction of the aspheric molds is most difficult and expensive. This new process makes possible exact reproductions of the required aspheric curve and has many other distinct advantages which will become apparent from the following disclosure.

An object is to provide a process for making inexpensive aspheric molds which may be made to identical specifications.

Figure 1:
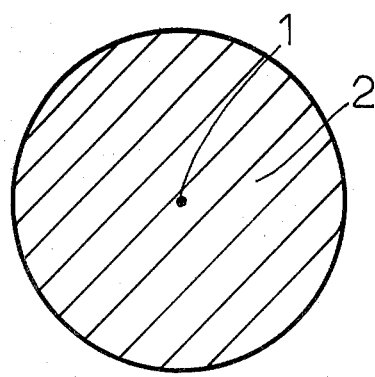
FIG. 1 shows the spin cast mold from above.
Figure 2:
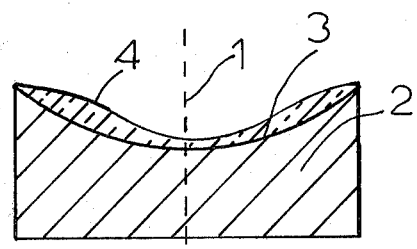
FIG. 2 shows the spherical metal mold and the resin aspheric surface in section.

The molds are made as follows:

The required aspheric concave mold surface may be made by polymerizing a selected liquid monomer in place on a rotating concave mold surface 3 FIG. 2. The liquid monomer surface 4 FIG. 2 will assume the required concave aspheric shape when rotated at the required speed around axis 1 FIG. 2. The liquid monomer is allowed to polymerize to form a solid having an optical quality aspheric surface 4 FIGS. 2 and 3. The resin surface 4 FIG. 2 may be used to spin cast many lenses having a convex aspheric surface 4 FIG. 3 and a matching concave aspheric surface 5 FIG. 3. The aspheric surfaces will neutralize each other and no aspheric refractive power will be present. Crosslinking monomers provide excellent mold release qualities for the aspheric mold surface 4 FIG. 2, examples are: Allyl Diglycol Carbonate, Ethylene Dimethacrylate, Triethylene Glycol Dimethacrylate, Allyl Methacrylate. These monomers may be polymerized as homopolymers or copolymers with other monomers. A mold release agent may be placed on the aspheric mold surface 4 FIGS. 2 and 3 to aid in removal of the finished lens 5 FIG. 3. The lens is made by placing the lens monomer on the concave aspheric surface 4 FIG. 3 and rotating the lens mold 2 FIG. 3 around the optical axis 1 FIG. 3. The lens liquid monomer will assume the aspheric surface 5 FIG. 3 and is allowed to polymerize to form a solid lens having a concave aspheric surface 5 FIG. 3 and a convex aspheric surface 4 FIG. 3. Examples of the lens monomer mixtures used are as follows:

| | | |
|---|---|---|
| (1) | Ethylene glycol monomethacrylate | 64.8% |
| | Diethylene glycol monomethacrylate | 7.056% |
| | Ethylene glycol dimethacrylate | 0.144% |
| | Water | 20.9% |
| | Ammonium persulfate | 1.1% |
| | 2-dimethylaminoethyl acetate | 6.0% |
| (2) | Ethylene glycol monomethacrylate | 54.7% |
| | Diethylene glycol monomethacrylate | 17.2% |
| | Diethylene glycol dimethacrylate | 0.6% |
| | Ammonium persulfate | 1.1% |
| | Dimethylaminoethyl acetate | 5.8% |
| | Water | 20.6% |
| (3) | Methylmethacrylate | 96.75% |
| | Ethylenedimethacrylate | 3.00% |
| | Benzoyl Peroxide | .25% |

Figure 3:
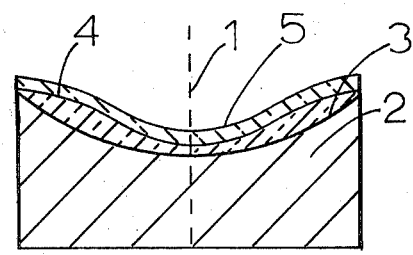
FIG. 3 shows the aspheric resin mold with the aspheric lens spun cast in section.

The finished concave aspheric mold FIG. 2 is now ready to be used to mold many aspheric convex optical surfaces 4 FIG. 3.

The aspheric resin mold FIG. 2 is placed in a spin cast machine and a lens 5 FIG. 3 is spun cast by rotating the mold 2 FIG. 3 around the optical axis 1 FIG. 3 to produce a concave aspheric lens surface 5 FIG. 3 with a correcting aspheric curve 4 FIG. 3 present on the convex surface. A soft contact lens made in this manner will have a spherical convex surface when in place on a spherical cornea.

It is understood that the degree or amount of aspherosity may be equal on both surfaces and the radius of curvature be different. This difference in radius of curvature provides the required refractive power for the contact lens. The equal amount of aspheric curvature reduced the refractive aberration caused by a different radius being present near the edge of the lens. This different radius toward the lens edge has the optical effect as increasing spherical aberration. Improved image quality will result if the convex surface is not of different radius toward the edge of the lens when the lens is in place on the eye.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of spin casting contact lenses having equal amounts of aspherosity on both the concave and convex lens surfaces and having no aspherosity when in place on a spherical cornea by the steps providing a concave spin casting mold, placing a selected liquid monomer in the concave mold, rotating the concave mold and the selected liquid monomer at a selected speed to form an aspheric concave surface on the selected liquid monomer, allowing the selected liquid monomer to polymerize to form a solid aspheric optical surface, adhering to the concave mold, adding a liquid lens monomer to the concave aspheric mold and rotating the aspheric surfaced lens mold and the selected lens monomer at the selected speed to form a concave aspheric surface on the liquid lens monomer and a convex aspheric lens surface formed against the aspheric concave mold, allowing the rotating liquid lens monomer to polymerize to form a lens having an aspheric concave and convex surface, removing the aspheric lens from the aspheric concave mold.

2. A method as in claim 1 wherein the curvature of the concave and convex surfaces are different.

3. A method as in claim 1 wherein the radius of the concave surface is shorter than the radius of the convex surface.

4. A method as in claim 1 wherein the radius of the concave surface is longer than the radius of the convex surface.

* * * * *